United States Patent
Baernthaler et al.

(10) Patent No.: US 7,972,092 B2
(45) Date of Patent: Jul. 5, 2011

(54) INSERT ADAPTED FOR USE IN BAR PEELING AND METHOD

(75) Inventors: Walter Baernthaler, Muerzhofen (AT); Helmut Trink, Fohnsdorf (AT)

(73) Assignee: Boehlerit GmbH & Co. KG, Kapfenberg (AT)

( * ) Notice: Subject to any disclaimer, the term of this patent is extended or adjusted under 35 U.S.C. 154(b) by 706 days.

(21) Appl. No.: 11/908,477

(22) PCT Filed: Mar. 13, 2006

(86) PCT No.: PCT/AT2006/000104
§ 371 (c)(1), (2), (4) Date: Sep. 12, 2007

(87) PCT Pub. No.: WO2006/099640
PCT Pub. Date: Sep. 28, 2006

(65) Prior Publication Data
US 2008/0159820 A1    Jul. 3, 2008

(30) Foreign Application Priority Data
Mar. 24, 2005    (AT) .................................. A 513/2005

(51) Int. Cl.
*B23B 27/22* (2006.01)
*B23P 15/28* (2006.01)
(52) U.S. Cl. ........................ 407/114; 407/116
(58) Field of Classification Search .......... 407/113–116, 407/117, 119
See application file for complete search history.

(56) References Cited

U.S. PATENT DOCUMENTS

| | | | |
|---|---|---|---|
| 4,449,864 A | 5/1984 | Haque et al. | |
| 4,968,195 A | 11/1990 | Hayakawa et al. | |
| 6,082,936 A | 7/2000 | Moriguchi et al. | |
| 6,676,339 B2 * | 1/2004 | Hartlohner | 407/114 |
| 6,684,742 B1 | 2/2004 | White | |
| 7,510,355 B2 * | 3/2009 | Havrda | 407/116 |
| 2003/0077131 A1 | 4/2003 | Wiman et al. | |
| 2003/0152430 A1 | 8/2003 | Mina | |
| 2003/0170081 A1 * | 9/2003 | Andersson et al. | 407/114 |
| 2005/0186040 A1 * | 8/2005 | Gati | 407/113 |
| 2007/0059112 A1 * | 3/2007 | Nudelman | 407/117 |

FOREIGN PATENT DOCUMENTS

| | | |
|---|---|---|
| DE | 22 24 529 | 11/1973 |
| DE | 197 25 341 | 12/1998 |
| DE | 203 20 089 | 4/2004 |
| EP | 0 054 481 | 6/1982 |
| EP | 0 502 834 | 9/1992 |
| EP | 0 812 650 | 2/2003 |
| EP | 1 297 921 | 4/2003 |
| FR | 2 164 302 | 7/1973 |
| FR | 2 483 819 | 12/1981 |
| JP | 59-214501 | 12/1984 |
| WO | 96/09908 | 4/1996 |

* cited by examiner

*Primary Examiner* — Will Fridie, Jr.
(74) *Attorney, Agent, or Firm* — Greenblum & Bernstein, P.L.C.

(57) ABSTRACT

An insert for rotary milling includes a polygonal member having at least one primary cutting edge and at least one secondary cutting edge arranged at an obtuse angle thereto. At least one connecting region is arranged between the at least one primary cutting edge and the at least one secondary cutting edge. The connecting region has a local radius of curvature. This abstract is not intended to define the invention disclosed in the specification, nor intended to limit the scope of the invention in any way.

18 Claims, 1 Drawing Sheet

US 7,972,092 B2

INSERT ADAPTED FOR USE IN BAR PEELING AND METHOD

CROSS-REFERENCE TO RELATED APPLICATIONS

The present application is a U.S. National Stage of International Patent Application No. PCT/AT2006/000104 filed Mar. 13, 2006 which published as WO 2006/099640 on Sep. 28, 2006, and claims priority of Austrian Patent Application No. A 513/2005 filed Mar. 24, 2005.

BACKGROUND OF THE INVENTION

1. Field of the Invention

The invention relates to an insert for bar peeling operations wherein the insert has a polygonal form in plan view as well as at least one primary cutting edge and one secondary cutting edge arranged at an obtuse angle thereto. The insert can also be reversible.

2. Discussion of Background Information

Semi-finished products, e.g., of stainless steel or of highly-alloyed materials, are generally produced by hot working the raw material. Before the semi-finished product is processed further, it can be necessary to machine the surface thereof. This machining is utilized in order to eliminate deformation troughs and/or oxide films or scale layers and/or defects therefrom. A dimensional accuracy of the semi-finished product that (may be desired) is also achieved in this manner.

A semi-finished product having a round cross section can be machined by cylindrical grinding, turning or bar peeling. Bar peeling of round bars is mostly utilized with larger batch sizes for economic reasons.

In principle, a device for bar peeling operations utilizes a rotating tool called a revolving head or peeling head with at least three cutting knives directed inwards. A knife trajectory circle of the tool has a smaller diameter than the round bar to be machined. The round bar is inserted into the rotating tool, and chips are removed by means of the knives while the round bar passes through the device. In this manner, round bars or rods can be sequentially manufactured with a machined surface in large production batches very economically.

In modern bar peeling devices so-called cassettes, which usually have inserts made of hard metal, are inserted and attached in the peeling head. The respective shape of the insert or peeling insert thereby depends on the tool system of the peeling machine, but in any case, the trajectory circle of the cutting edge therein forms a truncated cone on the feed side followed by a cylindrical section in the discharge direction. Accordingly, in plan view, peeling inserts have a polygonal shape with a primary cutting edge for the frusto-conical trajectory circle and, at an obtuse angle of approx. 155° thereto, a secondary cutting edge or smoothing cutting edge. The trajectory circle of runs essentially parallel to the rotational axis or with the same spacing thereto. The smoothing cutting edge also acts in a supporting manner for the machined bar, and guides it centrally in the peeling head.

In a coarse peeling operation, in particular with bar stock of stainless steels, highly nickeliferous alloys, and tough materials, tool chatter can increasingly occur with the use of known insert shapes. As a result, so-called chatter marks form on the machined surface. The electric power consumption of the peeling machine is also thereby increased and the service life of the peeling inserts seems reduced.

SUMMARY OF THE INVENTION

The invention aims to eliminate these disadvantages and provides for an insert of the type mentioned at the outset, which renders possible bar peeling with a smooth machine action or with a smooth cutting having low electric power consumption, avoids chatter marks on the rod, and provides increased service life of the cutting edges along with increased cutting performance.

The invention also provides for a generic insert which utilizes a connecting region between primary cutting edge and a secondary cutting edge that is rounded, provided that the local radius of curvature of the rounded area has a length of greater than 15 mm but less than 35 mm.

The advantages achieved with the invention are essentially that when a bar peeling is carried out utilizing a cutting edge embodiment according to the invention, even with materials that are hard to machine, such as, e.g., high chrome-containing steels, austenitic chromium-nickel steels and the like materials, a feared tear chip formation with chatter can be avoided and, with a reduced power consumption of the drive of the peeling device. Furthermore, a smooth chip formation with comparatively smooth machining surface of the round bars is achieved, and an edge-holding property of the tools is improved. The reason that an improved peeling chip is formed via the cutting edge geometry according to the invention has not been fully determined, but an avoidance of sudden changes in chip thicknesses could be one reason for this.

A further improvement of the peel machining can be achieved if the connecting region of the insert has a local radius of curvature of the rounded area of greater than 20 mm, but less than 33 mm.

According to another variant, the connecting region between primary cutting edge and secondary cutting edge is curved in a circular manner. The production of the insert or inserts can thus be simplified.

It was found that a smooth chip formation during the peeling operation, and a further reduction of the electric power consumption of the machine during peeling, can be promoted if the respective local radius of curvature of the rounded area of the insert is enlarged from the primary cutting edge towards the secondary cutting edge.

If the rounded area has the shape of a part of a hyperbola or a parabola, the cutting can be improved and the chip form shaped as desired particularly effectively.

According to a particularly preferred embodiment of the invention, the secondary cutting edge of the insert can be embodied as a smoothing cutting edge or arched cutting edge with a radius of 500 to 1500 mm, preferably 700 to 1200 mm. A particularly good billet surface can be achieved with low roughness height and low dimensional tolerances during peeling with cutting edges shaped in this manner.

A particularly simple and favorable shape for an insert with excellent metal-cutting properties, and good edge-holding property, can be achieved if the primary cutting edge is embodied as a circular cutting edge with a radius of less than 60 mm.

It can be advantageous for favorable chip formation, and to increase the cutting capacity with improved service life of the cutting edges, if the cutting face of the insert has a chip-breaking shoulder arranged parallel to the cutting edge at least in the area of the primary cutting edge and the rounded area towards the secondary cutting edge.

If the insert is embodied as an indexable peeling insert with at least four cutting areas, and bears a single-coat or multiple-coat hard-material coating, the highest possible cost-effectiveness can be achieved with a peel machining of round bars.

The invention also provides for an insert for rotary milling comprising a polygonal member having at least one primary cutting edge and at least one secondary cutting edge arranged at an obtuse angle thereto and at least one connecting region arranged between the at least one primary cutting edge and the at least one secondary cutting edge. A rounded area of the connecting region has a local radius of curvature that is greater than 15 mm but less than 35 mm.

The local radius of curvature may be greater than 20 mm, but less than 33 mm. The at least one primary cutting edge may be outwardly curved. The local radius of curvature may be greater than a local radius or curvature of the at least one primary cutting edge. The at least one secondary cutting edge may be curved. The at least one secondary cutting edge may be curved and the local radius of curvature may be less than a local radius or curvature of the at least one secondary cutting edge. The rounded area may have a hyperbola shape. The rounded area may have a parabola shape. The at least one secondary cutting edge may have a radius of curvature. The local radius of curvature of the at least, one secondary cutting edge may be between 500 mm and 1500 mm. The local radius of curvature of the at least one secondary cutting edge may be between 700 mm and 1200 mm. The at least one primary cutting edge may have a radius of curvature. The local radius of curvature of the at least one primary cutting edge may be less than 60 mm. The polygonal member may comprise a cutting face having a chip-breaking shoulder. The chip-breaking shoulder may be arranged parallel to at least the at least one primary cutting edge and the rounded area. The insert may be an indexable peeling insert having at least four cutting areas and one of a single-layer hard material coating and a multiple-layer hard-material coating.

The invention also provides for a method of making the insert of described above wherein the method comprises forming the at least one primary cutting edge, forming the at least one secondary cutting edge, and forming the connecting region.

The invention also provides for an insert comprising a polygonal member having a first cutting edge, a second outwardly curved cutting edge, and an outwardly curved connecting region arranged between said first and second cutting edges, wherein the connecting region has a rounded area whose radius is greater than 15 mm but less than 35 mm.

The invention also provides for an insert comprising a polygonal member having a first outwardly curved cutting edge, a second outwardly curved cutting edge, and an outwardly curved connecting region arranged between said first and second cutting edges, wherein the connecting region has a rounded area whose radius is greater than 15 mm but less than 35 mm.

BRIEF DESCRIPTION OF THE DRAWINGS

The invention is explained in more detail below based on drawings showing one manner of implementation in each case, wherein.

DETAILED DESCRIPTION OF THE INVENTION

In FIGS. 1A-1E, different prior art polygonal indexable inserts for bar peeling operations are shown diagrammatically in plan view, and are labeled in each case. That is, the different insert shapes are labeled "I", "J", "L", "U" and "X". Each of the inserts according to the prior art has at least one primary cutting edge and at least one secondary or smoothing cutting edge for a chip removal. These cutting edges form an obtuse angle with one another. An installation of indexable inserts is thereby carried out in cassettes of a cutting head, such that a secondary or smoothing cutting edge respectively of an insert is aligned essentially parallel to the axis of a billet to be peeled, or a rotational axis of a peeling tool, and a primary cutting edge runs at an obtuse angle outwards against a feed direction of the billet.

No specific polygonal form of an indexable insert is necessary for a geometry of the cutting edges according to the invention. Instead, the only essential factor is the shape of primary cutting edge and secondary cutting edge.

Figures 1A, 1B, 1C, 1D, 1E:
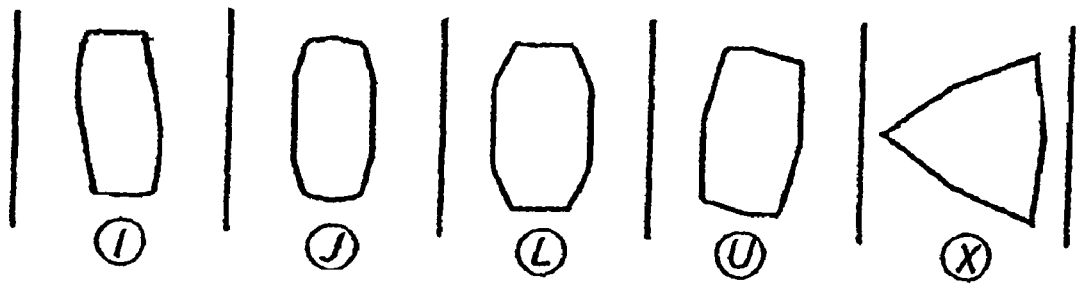
FIGS. 1A-1E show various prior art insert shapes (diagrammatic) of peeling inserts in plan view.
Figure 2:
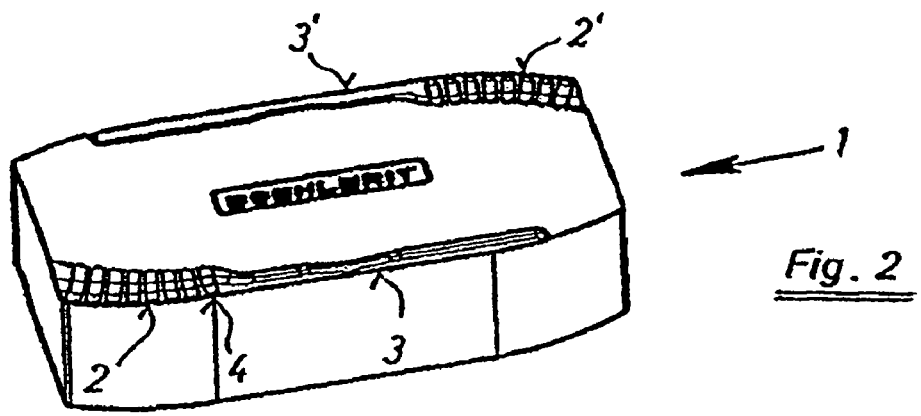
FIG. 2 shows a peeling insert according to the invention in perspective view.

FIG. 2 shows in diagrammatic form a perspective view of an insert 1 for a tool for bar peeling operations. The insert 1 is embodied as an indexable insert and has respectively one primary cutting edge 2 on one side, and one primary cutting edger 2' on another side as well as one secondary cutting edge 3 on one side, and one primary cutting edger 3' on the other side, which is often referred to as a smoothing cutting edge. A sharp-edged connecting region 4 is arranged between primary cutting edge 2 and secondary cutting edge 3.

Figure 3:
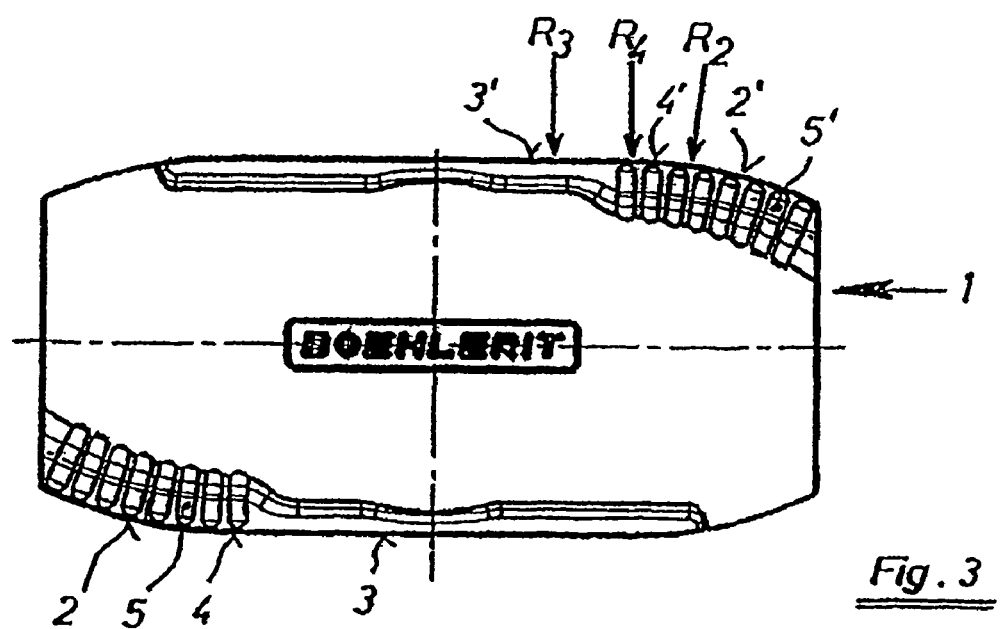
FIG. 3 shows the peeling insert according to the invention in plan view.

FIG. 3 shows an indexable insert 1 or peeling insert 1 according to the invention having flat support surfaces on the front. The secondary cutting edge 3, 3' has a radius R3 of, e.g., 1000 mm, and the cutting edge is aligned essentially parallel to the billet axis or rotational axis of a peeling head. The connecting region(s) 4, 4' of secondary cutting edge(s) 3, 3' and of the primary cutting edge(s) 2, 2' is rounded and has a radius of curvature R4 according to the invention. The primary cutting edge(s) 2, 2' attached thereto can be embodied in a straight manner or preferably has the form of a circular cutting edge 2, 2' utilizing a radius R2.

It is noted, by way of precaution, that the primary cutting edge(s) 2, 2' can have different geometric line shapes. However, it is essential for the invention that the local radius of curvature R4 of the rounded area have a length of greater than 15 mm but smaller than 35 mm.

The insert 1 for bar peeling operations can advantageously have plane-parallel bearing surfaces, whereby the cutting face section thereof has a chip-breaking trough(s) 5, 5'. These can be arranged at least in an area of a primary cutting edge(s) 2, 2', and are preferably parallel to the primary cutting edge(s) 2, 2', connecting region(s) 4, 4', and secondary cutting edge(s) 3, 3'.

The invention claimed is:

1. An insert for rotary milling comprising:
   a polygonal member having at least one primary cutting edge and at least one secondary cutting edge arranged at an obtuse angle thereto;
   at least one connecting region arranged between the at least one primary cutting edge and the at least one secondary cutting edge;
   a rounded area of the connecting region having a local radius of curvature that is greater than 15 mm but less than 35 mm; and
   the at least one primary cutting edge being outwardly curved,
   wherein the local radius of curvature is greater than a local radius of curvature of the at least one primary cutting edge.

2. An insert for rotary milling comprising:
   a polygonal member having at least one primary cutting edge and at least one secondary cutting edge arranged at an obtuse angle thereto;
   at least one connecting region arranged between the at least one primary cutting edge and the at least one secondary cutting edge;

a rounded area of the connecting region having a local radius of curvature that is greater than 15 mm but less than 35 mm; and the at least one primary cutting edge being outwardly curved, wherein the at least one secondary cutting edge is curved.

3. An insert for rotary milling comprising:

a polygonal member having at least one primary cutting edge and at least one secondary cutting edge arranged at an obtuse angle thereto;

at least one connecting region arranged between the at least one primary cutting edge and the at least one secondary cutting edge; and a length of the at least one secondary cutting edge being greater than a length of the at least one primary cutting edge, wherein a rounded area of the connecting region has a local radius of curvature that is greater than 15 mm but less than 35 mm.

4. The insert of claim 3, wherein the local radius of curvature is greater than 20 mm, but less than 33 mm.

5. The insert of claim 3, wherein the at least one primary cutting edge is outwardly curved.

6. The insert of claim 3, wherein the at least one secondary cutting edge is curved.

7. An insert for rotary milling comprising:

a polygonal member having at least one primary cutting edge and at least one secondary cutting edge arranged at an obtuse angle thereto;

at least one connecting region arranged between the at least one primary cutting edge and the at least one secondary cutting edge;

a rounded area of the connecting region having a local radius of curvature that is greater than 15 mm but less than 35 mm; and the at least one secondary cutting edge being curved, wherein the local radius of curvature is less than a local radius or of curvature of the at least one secondary cutting edge.

8. The insert of claim 3, wherein the rounded area has a hyperbola shape.

9. The insert of claim 3, wherein the rounded area has a parabola shape.

10. The insert of claim 3, wherein the at least one secondary cutting edge has a radius of curvature.

11. The insert of claim 10, wherein the local radius of curvature of the at least one secondary cutting edge is between 500 mm and 1500 mm.

12. The insert of claim 10, wherein the local radius of curvature of the at least one secondary cutting edge is between 700 mm and 1200 mm.

13. The insert of claim 3, wherein the at least one primary cutting edge has a radius of curvature.

14. The insert of claim 13, wherein the local radius of curvature of the at least one primary cutting edge is less than 60 mm.

15. The insert of claim 3, wherein the polygonal member comprises a cutting face having a chip-breaking shoulder.

16. The insert of claim 15, wherein the chip-breaking shoulder is arranged parallel to at least the at least one primary cutting edge and the rounded area.

17. An insert for rotary milling comprising:

a polygonal member having at least one primary cutting edge and at least one secondary cutting edge arranged at an obtuse angle thereto;

at least one connecting region arranged between the at least one primary cutting edge and the at least one secondary cutting edge; and a rounded area of the connecting region having a local radius of curvature that is greater than 15 mm but less than 35 mm, wherein the insert is an indexable peeling insert having at least four cutting areas and one of a single-layer hard material coating and a multiple-layer hard-material coating.

18. A method of making the insert of claim 3, the method comprising:

forming the at least one primary cutting edge;

forming the at least one secondary cutting edge; and forming the connecting region.

* * * * *